(No Model.) 2 Sheets—Sheet 1.
F. E. IVES.
PHOTOCHROMOSCOPE AND PHOTOCHROMOSCOPE CAMERA.
No. 546,889. Patented Sept. 24, 1895.
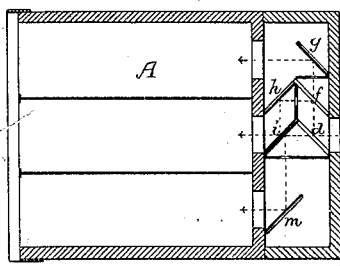
FIG. 6.
FIG. 1.
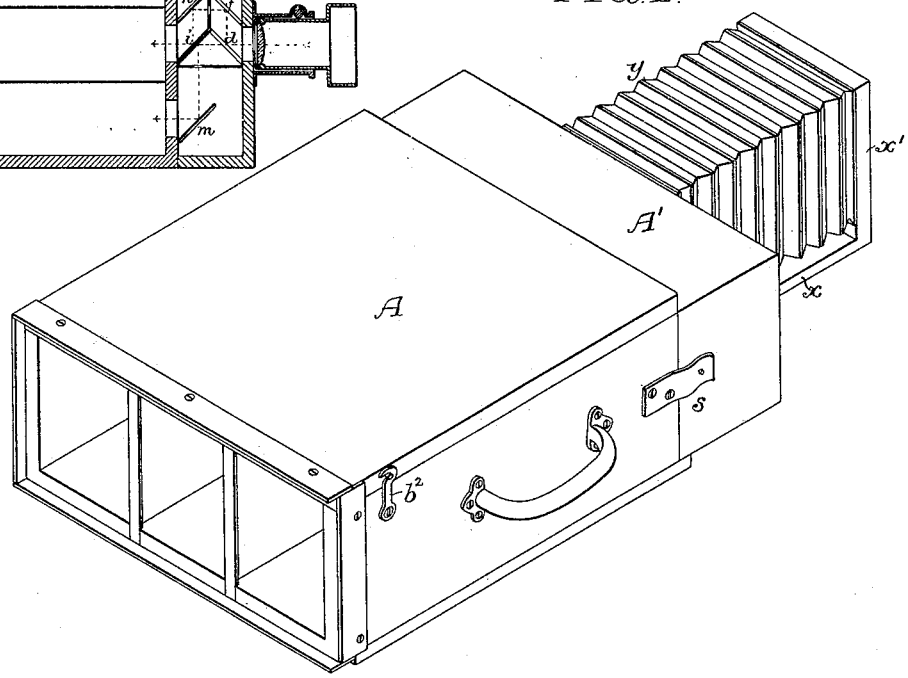
FIG. 2.
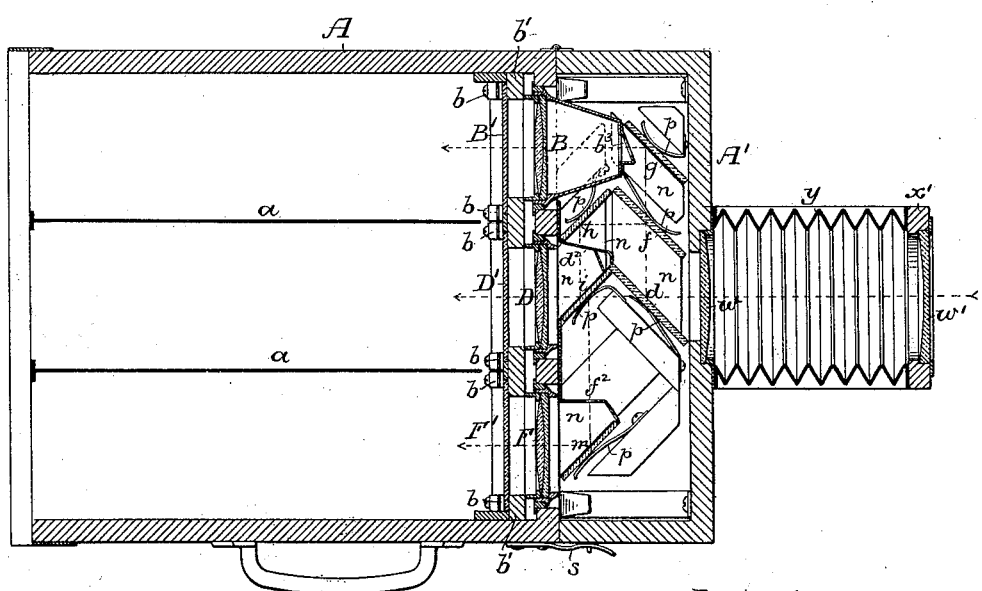
Witnesses:
Fred C. Benner
Frank E. Bechtold
Inventor:
Frederic E. Ives
by his Attorneys
Howson & Howson
ANDREW B. GRAHAM, PHOTO-LITHO, WASHINGTON, D.C.

(No Model.) 2 Sheets—Sheet 2.

F. E. IVES.
PHOTOCHROMOSCOPE AND PHOTOCHROMOSCOPE CAMERA.

No. 546,889. Patented Sept. 24, 1895.

Witnesses:
Fred C. Benner
Frank E. Bechtold

Inventor:
Frederic E. Ives
by his Attorneys
Howson & Howson

UNITED STATES PATENT OFFICE.

FREDERIC E. IVES, OF PHILADELPHIA, PENNSYLVANIA.

PHOTOCHROMOSCOPE AND PHOTOCHROMOSCOPE-CAMERA.

SPECIFICATION forming part of Letters Patent No. 546,889, dated September 24, 1895.

Application filed February 1, 1895. Serial No. 536,939. (No model.)

*To all whom it may concern:*

Be it known that I, FREDERIC E. IVES, a citizen of the United States, residing in Philadelphia, Pennsylvania, have invented certain Improvements in Photochromoscopes and Photochromoscope-Cameras, of which the following is a specification.

One object of my invention is to so construct a photochromoscope or photochromoscope-camera that by means of such camera three images side by side upon the same sensitive plate or film can be produced, or, in the case of the photochromoscope, a plate having the images so disposed can be used, a further object being to employ a fixed focus or extension camera and to render unnecessary any change in the character of the reflecting-mirrors in order to properly focus the images for objects at any distance, and a still further object being to provide means for properly retaining the reflecting-mirrors in place and yet permit of the ready removal and replacing of the same as may be required for proper cleansing or repair.

Figure 3:
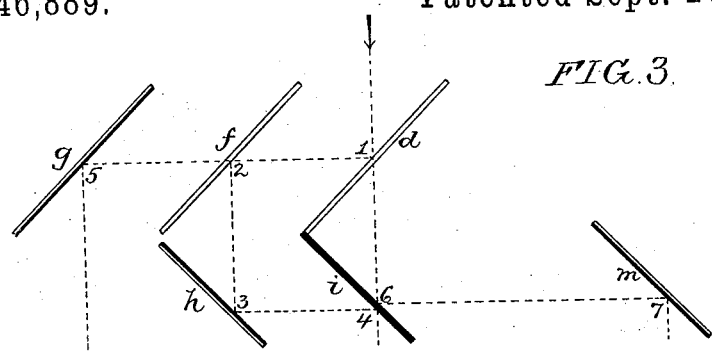
Figure 4:
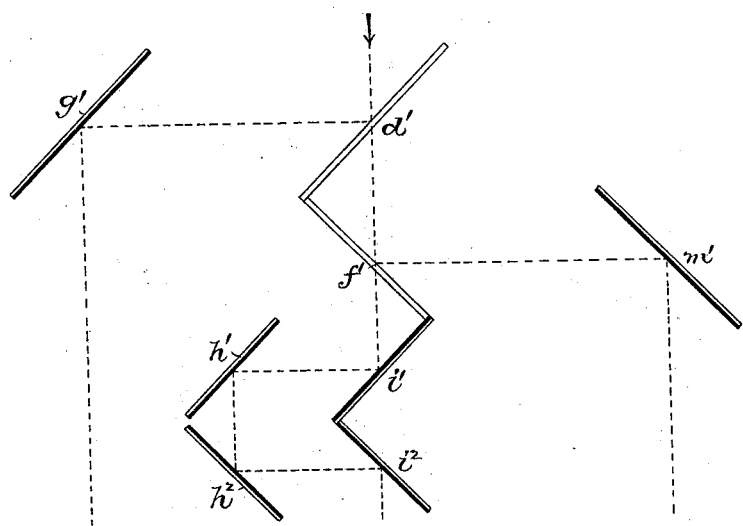
Figure 5:
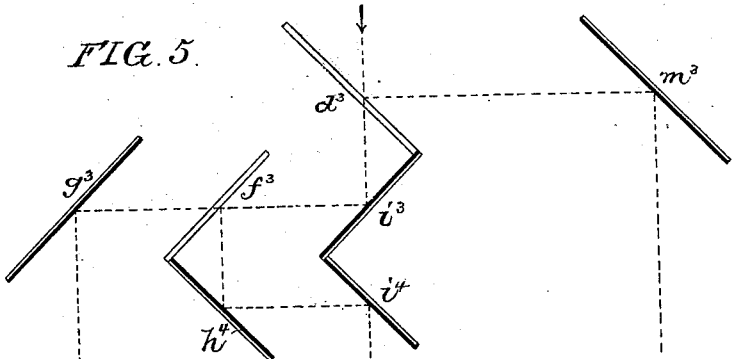

In the accompanying drawings, Figure 1 is a perspective view of a photochromoscope-camera constructed in accordance with my invention. Fig. 2 is a sectional plan view of the same. Fig. 3 is a diagram illustrating the arrangement of reflecting-mirrors employed. Figs. 4 and 5 are similar diagrams illustrating modified combinations of mirrors which may be used, and Fig. 6 is a sectional view on a smaller scale of a modified form of the camera.

In Figs. 1 and 2, A represents a box or casing of appropriate size and shape, preferably divided internally into three portions by means of longitudinal partitions $a\,a$, this box being provided at its rear end with any suitable means for supporting and retaining the sensitive plate or film and its holder and having at the front end three objective lenses B, D, and F, located side by side, and each adapted to project an image onto its respective portion of the sensitive plate or film supported at the rear end of the camera, a suitable color-screen being employed in connection with each of the objective lenses. Thus the color-screen B', employed in connection with the lens D, may be a green screen, the screen D', employed in connection with the lense D, may be blue, and the screen F', employed in connection with the lens F, may be red. These color-screens are held in place by means of springs $b$ against a perforated partition-plate $b'$ in the rear of the lens-frames, so that each screen can be readily removed for cleaning and as readily replaced after being cleaned, the top of the casing A being hinged and normally held in place by a suitable catch $b^2$, so that on releasing the catch the top can be raised to permit access to the color-screens and the interior of the camera.

Hinged to the front end of the casing A, at one side of the latter, is another casing A', open on that side which is toward the casing A, this casing A' carrying the series of transparent and opaque mirrors whereby the incident rays are divided and reflected so as to be thrown through the three objective lenses and onto the different portions of the sensitive plate or film.

The system of mirrors shown in Figs. 2 and 3 comprises two transparent mirrors $d$ and $f$, and four opaque mirrors $g$, $h$, $i$, and $m$, the mirrors $d$, $f$, and $g$ all being inclined in the same direction and at the same angle in respect to the line of the incident rays, and the three mirrors $h$, $i$, and $m$ being inclined in the same direction and at the same angle in respect to the line of the incident rays, the angle of the three mirrors $h$, $i$, and $m$ being the reverse of the angle of the mirrors $d$, $f$, and $g$. The mirrors $g$, $h$, and $m$ have but one reflecting-face, while the mirror $i$ reflects from both its front and rear faces. The mirror $d$ is directly in line of the incident rays and the mirror $i$ is behind the same and in front of the central lens D. The mirror $h$ faces the back of the mirror $i$ and is in the rear of the mirror $f$, the mirror $g$ is in front of the lens B, and the mirror $m$ faces the front of the mirror $i$ and is in front of the lens F. The incident rays striking the mirror $d$ are divided, a portion of the rays being transmitted through said mirror onto the front of the mirror $i$, and being thence reflected onto the mirror $m$, and from the latter through the lens F. Those rays which are reflected from the mirror $d$ strike the mirror $f$ and are again divided, a portion of the rays being transmitted through said mirror onto the mirror $g$ and being by the latter reflected through the lens B, while those rays which are reflected by the mirror $f$ strike the mirror $h$, and are thence reflected onto the back of the mirror $i$, and by the latter through the central lens D.

The various mirrors are so disposed in respect to each other that the length of each ray from the point of impact upon the mirror $d$ to the surface of the sensitive plate or film shall be exactly the same—that is to say, the rays transmitted to the central portion of the sensitive-plate shall in their four reflections 1 2 3 4, Fig. 3, traverse the same lateral distance as the rays for one end of the plate in their two reflections 1 5, or the rays for the other end of the plate in their two reflections 6 7, the longitudinal distance traveled by the rays forming each image being of course the same in all three images. By thus providing for a single lateral reflection of the rays which form the outside images on the plate or film and for a double lateral reflection of the rays which form the central image, I am enabled to form three precisely similar images, side by side, upon the same plate, and am thus enabled to produce comparatively large images without the use of an inordinately large plate, thus overcoming an objection to the instrument shown in my Patent No. 475,084, dated May 17, 1892, in which the mirrors and lenses were so disposed as to produce a trefoil arrangement of the images upon the plate, thus necessitating the use of a square instead of an oblong plate or film and involving the loss of a comparatively large area of the plate, or, in other words, only a partial covering of the plate by the three images, whereas in the present camera the three images occupy the entire plate or film.

In connection with each of the lenses B, D, and F a perforated diaphragm for properly limiting the transmission of light to the lens is employed, the diaphragm $b^3$ of the lens B being located in front of said lens and between the same and the mirror $g$, while the diaphragm $d^2$ for the lens D is located between the mirrors $h$ and $i$, and the diaphragm $f^2$ for the lens F is located between the mirrors $i$ and $m$.

Each of the mirrors is held in contact with a suitable stop-block $n$ at top or bottom by means of a spring $p$, so that while the mirror is properly retained in its relation to the other parts of the instrument when in use it can be readily removed or replaced when cleaning or repair becomes necessary, ready access to the mirrors and diaphragms being permitted on swinging open the casing A', which is normally held in a closed position by means of a spring-catch $s$.

The transparent mirrors $d$ and $f$ are preferably of clear glass having plane surfaces, which surfaces may or may not be exactly parallel with each other, although to avoid a doubling of outlines in the images on the sensitive plate or film the plane surfaces must ordinarily be exactly parallel to each other for photographing distant objects, but inclined to each other, so as to make the mirror very slightly wedge-shaped for nearer objects, the inclination of the surfaces to each other necessary to avoid doubling of outline in the images being different for every different distance of object requiring a change in the extension of the camera to obtain a sharp focus.

Owing to the trouble and expense of changing the transparent mirrors for objects at different distances, I use a camera with a fixed focus or fixed extension and employ transparent mirrors adapted to give images free from doubling of outline at that focus or extension, and focus for objects at various distances by means of a focusing lens or lenses placed between the object and the first of the transparent mirrors $d$.

I prefer to employ for focusing purposes a combination of one positive and one negative lens adjustable in respect to each other, said lenses at one adjustment neutralizing each other or securing a sharply-focused image in the camera for objects at one distance, but altering the focus of the camera when separated or brought nearer together. I prefer a plano-convex positive lens $w$ fixed to the casing A', and a plano-concave negative lens $w'$ carried by the head $x'$ of an adjustable slide $x$, between which head and the front of the casing A' is an ordinary form of bellows $y$ to exclude the light. If when the lens $w'$ is brought close to the lens $w$ the lenses neutralize each other, they have, when separated, a positive focus, which becomes shorter and shorter as the separation is increased, thereby bringing nearer objects into focus without disturbing the relation between the mirrors, objective lenses, and sensitive plate or film of the camera, and thus focusing for objects at all distances without change of camera extension and without any doubling of outline in the images produced. This focusing device is also applicable to my former camera or to an ordinary fixed focus-camera for producing a single image, and may be so employed, if desired, and while it is employed, by preference, in my improved triple camera with its mirrors, as described, it is not absolutely essential in that camera, since a single focusing-lens adjustable in respect to the mirror $d$ might be used, if desired—for instance, if the camera without the focusing lens be made to focus normally without any doubling of outline in the images for a near object—say one or two feet away—the focusing-lens may be concave or negative in order to bring more distant objects into focus without changing the camera extension, while if, on the other hand, the camera be made to focus normally for distant objects a convex or positive focusing-lens may be employed in order to focus for nearer objects. In all cases, however, the focusing-lens—or one of them, if two are used—should be made adjustable from and toward the first of the transparent mirrors $d$, so as to insure accurate focusing It is also possible, in case a comparatively narrow angle of view and a certain amount of pincushion distortion are permissible, to omit the lenses B, D, and F, and use only a positive lens in advance of the mirror $d$, this lens both forming and focusing the images. Such a construction is illustrated in Fig. 6.

Although I have described my invention as applied to a photochromoscope-camera it will be evident that it is applicable to a photochromoscope as well, by a simple reversal of the direction of the light-rays, a plate or film with the positive images being located at the plate-holder end of the casing A, while the eye is applied to the focusing lens or lenses or to the aperture in advance of the first mirror $d$.

Although I prefer the arrangement of mirrors shown in Figs. 2 and 3, other arrangements of mirrors may be employed which will effect the same result—that is to say, the double lateral reflection of the central rays and the single lateral reflection of the side rays—so as to insure the uniform length of rays for all of the images in their transmission from the primary mirror of the series to the sensitive plate or film.

In Figs. 4 and 5 I have shown two modified arrangements of mirrors, that shown in Fig. 4 comprising two transparent mirrors $d'$ and $f'$ and six opaque mirrors $g'$, $h'$, $h^2$, $i'$, $i^2$, and $m'$, the mirrors $d'$, $f'$, $i'$, and $i^2$ being located one behind the other in the direction of the incident rays, the mirror $g'$ facing the mirror $d'$, the mirror $m'$ facing the mirror $f'$, and the two mirrors $h'$ and $h^2$ facing, respectively, the mirrors $i'$ and $i^2$, the course of the rays being indicated by the respective dotted lines.

In Fig. 5 I have shown a combination comprising transparent mirrors $d^3$ and $f^3$ and opaque mirrors $g^3$, $h^4$, $i^3$, $i^4$, and $m^3$, the mirrors $d^3$, $i^3$, and $i^4$ being being located one behind the other in the line of the incident rays, the mirror $m^3$ facing the mirror $d^3$, the transparent mirror $f^3$ and opaque mirror $g^3$ facing the mirror $i^3$, and the mirror $h^4$ facing the mirror $i^4$ and being located at an angle the reverse of the mirror $f^3$, so as to receive the reflected rays therefrom.

In the case of the photochromoscope the color-screens may, if desired, be outside of the instrument—that is to say, interposed between the images and the source of light—or color-screens may be combined with the sensitive plate or film, or the latter itself may be dyed or colored so that each image constitutes its own color-screen.

Having thus described my invention, I claim and desire to secure by Letters Patent—

1. In a photochromoscope or photochromoscope camera, the combination of a casing, the lens or lenses, and a series of mirrors some of which are transparent, these mirrors being so disposed as to provide for the transmission of rays of light to or from three images located side by side in the same plane, the rays for the central image being laterally reflected once more than those for the side images, whereby the length of the rays for all of the images is the same.

2. In a photochromoscope or photochromoscope camera, the combination of the casing having a fixed extension, a series of mirrors some of which are transparent, said mirrors being so disposed as to provide for the transmission of rays of light to or from three images located side by side, and a focusing lens or lenses located in advance of the first mirror of the series, substantially as specified.

3. In a photochromoscope or photochromoscope camera, the combination of the casing having a fixed extension, one or more objective lenses for focusing the image at such fixed extension of the camera, a series of mirrors some of which are transparent, said mirrors being so disposed as to provide for the transmission of rays of light to or from three images, and a pair of focusing lenses located in advance of the objective lens or lenses and of the primary mirror of the series, one of said focusing lenses being positive and the other negative, and one being adjustable in respect to the other, substantially as specified.

4. The combination of a camera having a fixed extension and one or more objective lenses for focusing the image at such fixed extension of the camera, with a focusing device located in advance of said objective lens or lenses and comprising a fixed positive lens and a negative lens mounted in advance of the positive lens and adjustable in respect to the same, substantially as specified.

5. In a photochromoscope camera, the combination of the casing having three objective lenses so located as to form images side by side on the same sensitive plate or film, a series of mirrors some of which are transparent, said mirrors being so arranged as to divide the incident rays and project the same through the three objective lenses, and a focusing lens or lenses located in advance of the primary mirror of the series, substantially as specified.

6. The combination of the camera casing and its lenses, with a supplementary casing detachably secured to the front of the camera casing and carrying a series of mirrors some of which are transparent, said mirrors being so disposed as to transmit rays of light to or from the lenses, substantially as specified.

7. The combination of the casing of the camera, a series of mirrors some of which are transparent, blocks presenting faces inclined in respect to the line of the incident ray and serving as fixed bearings for said mirrors, and springs for maintaining the mirrors in contact with said blocks, but permitting of the removal of the same, substantially as specified.

In testimony whereof I have signed my name to this specification in the presence of two subscribing witnesses.

FREDERIC E. IVES.

Witnesses:
WILL. A. BARR,
JOSEPH H. KLEIN.